United States Patent

Bolles

[15] 3,653,972
[45] Apr. 4, 1972

[54] DISPOSABLE RESERVE CELL WITH ENCAPSULATED ELECTROLYTE

[72] Inventor: Theodore F. Bolles, Woodbury, Minn.
[73] Assignee: Minnesota Mining and Manufacturing Company, St. Paul, Minn.
[22] Filed: Nov. 3, 1969
[21] Appl. No.: 873,197

[52] U.S. Cl. .................................................. 136/90, 136/113
[51] Int. Cl. ............................................................ H01m 21/10
[58] Field of Search ............................................ 136/90, 113, 114

[56] References Cited

UNITED STATES PATENTS

| 2,783,291 | 2/1957 | Gold | 136/113 X |
|---|---|---|---|
| 3,009,007 | 11/1961 | Bryant, Jr. | 136/90 |
| 3,173,811 | 3/1965 | Amiet | 136/90 |
| 3,293,080 | 12/1966 | Gruber et al. | 136/90 X |
| 3,298,868 | 1/1967 | Smith et al. | 136/114 X |
| 3,423,489 | 1/1969 | Arens et al. | 136/90 UX |
| 3,440,106 | 4/1969 | Bakan et al. | 136/90 X |
| 3,454,430 | 7/1969 | Gruber | 136/90 X |
| 3,532,555 | 10/1970 | Jerabek et al. | 136/114 |

FOREIGN PATENTS OR APPLICATIONS 751,466  6/1956  Great Britain ........................... 136/90

Primary Examiner—Benjamin R. Padgett
Assistant Examiner—Harvey E. Behrend
Attorney—Kinney, Alexander, Sell, Steldt & Delahunt

[57] ABSTRACT

A disposable reserve cell for the production of an electrical current in which the aqueous electrolyte is contained in a multiplicity of small capsules. The cell is activated by rupturing a substantial portion of the capsules thereby releasing the electrolyte.

5 Claims, 2 Drawing Figures

Patented April 4, 1972
3,653,972
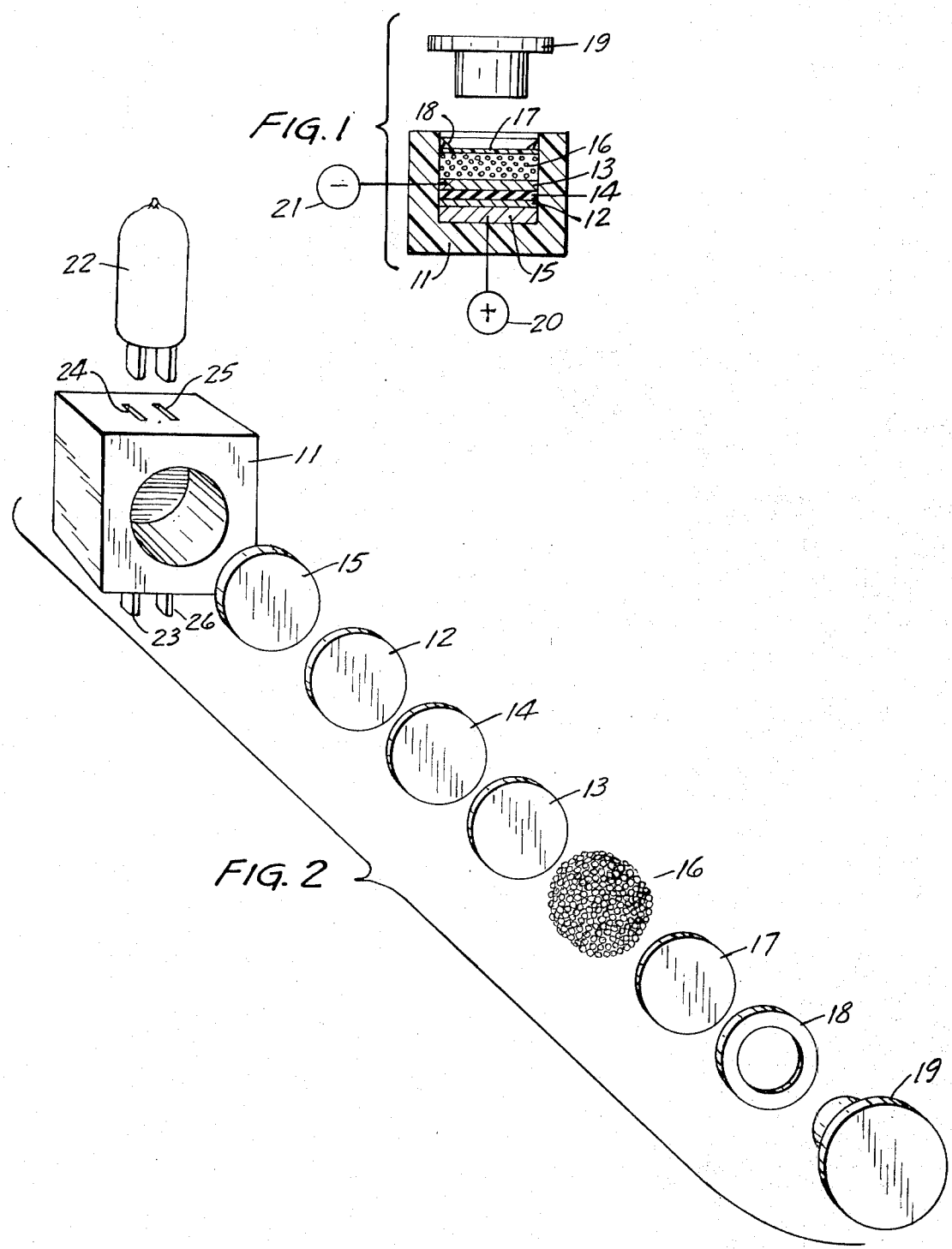
INVENTOR.
THEODORE F. BOLLES
BY Kinney, Alexander,
Sell, Steldt & DeLaHunt
ATTORNEYS 3,653,972

DISPOSABLE RESERVE CELL WITH ENCAPSULATED ELECTROLYTE

BACKGROUND OF THE INVENTION

The present invention relates to a disposable reserve cell for the production of electrical current.

Perhaps the best known type of electrochemical cell is the primary cell (such as the conventional zinc-carbon flashlight battery). In these primary cells the components are in electrochemical contact from the time of manufacture. Consequently deterioration begins with manufacture and shelf life is definitely limited, regardless of whether or not the cell is used. Polarization, internal resistance and other internal effects greatly reduce the voltage delivered by and energy density of such cells. If higher energy electrochemical systems are utilized to increase voltage and current output, much shorter shelf life results. Primary cells with acceptable shelf life have sufficiently low voltage and amperage outputs that two or more are usually required to operate even the simplest devices, due largely to contact resistances.

In reserve cells, electrochemical action is initiated when desired, such as by releasing electrolyte to contact the electrodes thereof. The foregoing disadvantages of the primary cell are thus generally obviated. An example of a reserve cell is provided by U.S. Pat. No. 3,057,948. The reserve cell disclosed therein comprises a housing of soft plastic which contains two electrodes, a non-conductive absorbent material separating the electrodes and a large shaped reservoir of thin glass or other fragile material containing a rigid member such as a solid glass ball and a liquid electrolyte. The cell is activated by striking the soft housing, thereby breaking the reservoir and releasing the electrolyte. The rigid member aids in shattering the reservoir. Several of these cells can be stacked together and activated by a single blow, the force being transmitted from cell to cell by the rigid members therein.

While overcoming the major disadvantages of primary cells, as previously noted, the reserve cell of U.S. Pat. No. 3,057,948 itself has several drawbacks. Thus it could be easily activated by accident in handling or during storage. In such case, the cell would be generally incapable of delivering the desired electrical current at the time of its intended use, since the cell when activated would lose its electrochemical energy within a limited time. Since accidental activation would be generally difficult to detect, serious inconvenience might result. In addition such cells would be difficult and expensive to manufacture in view of the need to fabricate a shaped, liquid-tight reservoir containing a relatively large amount of a corrosive chemical together with a large solid object, the reservoir being of a fragile material such as thin glass. Miniaturization would be difficult or impossible.

Another type of device for the generation of an electrical current is the so-called fuel cell in which a continuous supply of fresh electrochemical reactants and continuous removal of the products of the reaction are provided for. Ideally such a cell will continue to deliver an invariant electrical current for so long as the reactants are supplied and the reaction products are removed. An example is shown in U.S. Pat. No. 3,260,620 which discloses fuel cells in which various of the electrochemical components move past active electrode sites on a mobile separator. Liquid components of the fuel cells disclosed in that patent can be applied to the separator as a coating of rupturable capsules. Such fuel cells, although simple in principle, require relatively complex and expensive equipment to supply fresh electrochemical components continually, to drive the separator past the current collecting points, to rupture the capsules on the separator and to dispose of the exhausted separator. Thus they are restricted by cost as well as by the bulk and weight of attendant apparatus to relatively few uses.

For certain important areas of utility none of the foregoing are actually satisfactory. Thus, in powering certain devices which are used on an occasional or emergency basis (e.g., to transmit radio or light signals or ignition devices, such as devices for igniting photo flash bulbs), a low cost electrochemical cell is desired which can be easily mass produced at low cost, stored indefinitely and handled roughly with essentially no chance of accidental activation, then activated when needed to deliver immediately a predetermined current at a relatively high voltage for a limited time and then disposed of. Such cells should be of small size and light weight.

The reserve cells of the present invention readily satisfy these requirements. They can be easily mass produced (using simple low cost sheet materials if desired), stored indefinitely and handled roughly with essentially no chance of accidental activation. They can easily be miniaturized and are characterized by high energy density (i.e., amps per unit weight) output. They can be easily activated when desired to deliver a predetermined electrical output (amperage and voltage), then disposed of. Since they are reserve cells, less stable electrochemical systems capable of high voltage and amperage outputs can be used.

DESCRIPTION OF THE INVENTION

The reserve cells of the present invention comprise a casing containing a cathode, an anode, a multiplicity of capsules ranging in diameter substantially from 10 to 4,000 microns filled with an aqueous electrolyte and means for rupturing capsules from the exterior of the casing. The capsule shells are composed of a material which melts between 40° and 110° C. and which is immiscible in the aqueous electrolyte when both are in the liquid form. Ordinarily, but not always, the reserve cells also have a non-conducting porous separator between the cathode and the anode which prevents their direct contact and which can act as a wick to draw electrolyte into contact with the electrodes. The capsules can be ruptured from the exterior of the casing by either pressure or by heat, usually the former. Capsule rupture by heat is envisioned in reserve cells of the invention used in integral fire alarm-reserve cell devices and other heat-activated systems. Referring now to the drawings wherein:

FIG. 1 is a sectional side view of a basic embodiment of the invention.

FIG. 2 is an exploded perspective view of an article of the invention shown adapted for use with a photographic flash bulb.

In FIG. 1, 11 denotes a casing which is preferrably of a plastic material having a chamber opening on one side designed to receive the elements of the cell and provided with means for conveying the current generated by the cell to contact points where it can be utilized by external appliances. Within the casing are a cathode 12, an anode 13 and a non-conducting porous separator 14 (e.g., of a suitable paper, other non-woven webbing, porous plastic sheeting or a similar material), a current collector 15 adjacent the cathode (although this may not always be required), capsules 16 containing electrolyte as liquid fill therein, a thin impermeable elastic cover 17 (which can be of an elastomeric or deformable polymeric material) and a retaining ring 18. The cover 17 and the retaining ring permit pressure rupture of the capsules from outside the casing while preventing leakage of the electrolyte. The cell can be sealed by known means such as heat or an adhesive. The plunger 19 provides a means for rupturing the capsules thereby activating the cell. The leads 20 and 21 conduct the electrical current produced by the cell to an external circuit. No separator between the electrodes is actually required if they do not touch, but may be desired for other reasons, e.g., to provide a wick for distribution of the electrolyte.

FIG. 2 illustrates a similar cell adapted to be used at the power source for igniting a photo flash bulb 22. Elements 11–19 are as in FIG. 1, 23 and 26 are conductor prongs through which the circuit can be completed (and which can, for example, be plugged into a camera) and 24 and 25 are electrical connection sites adapted to receive a flash bulb base. Thus the reserve cell is placed in series with 23 and 24 while 25 and 26 are connected directly by a conductor. The reserve cell is activated and a flash bulb is plugged into sites 24 and 25. When the circuit is completed through 23 and 26, e.g., simultaneously with the release of a camera shutter, the flash bulb is ignited.

Threaded socket, or other types of electrical connections could, of course, be used in place of the prong connectors shown. One cell is normally sufficient to ignite several flash bulbs and will remain active for some time (e.g., several hours) after it has been activated or until it is exhausted. Thus the cells can be readily adapted for use with flash cubes.

The following are some examples of electrochemical systems suitable for use in the reserve cells of the present invention together with the approximate voltages generated.

| Anode: | Zinc |
|---|---|
| Cathode: | $PbO_2$ |
| Electrolyte: | Aqueous $H_2SO_4$ |
| Voltage: | 2.4 |
| Anode: | Zinc |
| Cathode: | $MnO_2$ |
| Electrolyte: | Aqueous $NH_4Cl$, $ZnCl$ |
| Voltage: | 1.5 |
| Anode: | Zinc |
| Cathode: | $MnO_2 + NH_4Cl$, $ZnCl$ |
| Electrolyte Solvent: | $H_2O$ |
| Voltage: | 1.5 |
| Anode: | Zinc |
| Cathode: | $Ag_2O$ |
| Electrolyte: | Aqueous KOH Solution |
| Voltage: | 1.9 |
| Anode: | Lead |
| Cathode: | $PbO_2$ |
| Electrolyte: | Aqueous Sulfuric Acid |
| Voltage: | 2.0 |
| Anode: | Magnesium |
| Cathode: | AgCl |
| Electrolyte: | $H_2O$ or Aqueous NaCl Solution |
| Voltage: | 1.6 |
| Anode: | Zinc |
| Cathode: | HgO |
| Electrolyte: | 40% Aqueous KOH Solution |
| Voltage: | 1.3 |

These are illustrative only and many other known systems can be used instead. The metal anodes are advantageously in the form of circular disks of screen (i.e., woven wire) to promote contact between the anode and the electrolyte and to facilitate rupture of the capsules, although solid or perforated metal foil or sheeting can also be used.

A preferred electrochemical system herein is the zinc-lead dioxide-aqueous sulfuric acid system. Such a cell can be quite small (due to high energy density and amperage), is composed of available and inexpensive material and is easily manufactured. Finely divided lead dioxide is advantageously used to obtain high current density. A suitable lead dioxide cathode can be prepared by overcoating a chemically inert conductor sheet (which acts as a current conductor) with finely divided lead dioxide in a water soluble binder, such as polyvinyl alcohol. The chemically inert conductor can be prepared on a polymeric film base, e.g., a polyester such as polyethylene terephthalate, by first applying a metal layer thereto (such as by vapor deposition or by lamination of a foil) then coating the metal layer with finely divided carbon, such as acetylene black or graphite, in a water insoluble binder, such as a styrene-butadiene copolymer. In such a cell the aqueous electrolyte contacts the lead dioxide particles in the water soluble layer as soon as it is released from the capsules but does not readily penetrate the adjacent water insoluble binder. Such a cell furnishing a total charge of 26 ampseconds requires only about 26.4 milligrams of $H_2SO_4$ (258 milligrams of 1 molar aqueous solution), 30 milligrams of $PbO_2$ and 8 milligrams of zinc.

The electrolytes suitable for use in the present invention are generally aqueous in order to generate useful voltages. Aqueous fills are quite difficult to encapsulate, although it has been found that they can be prepared by the process disclosed in U.S. Pat. No. 3,423,489 (Arens et al.). Preferably these are in about the 300–3,000 micron range, for reasons of ease of capsule preparation and use. As previously stated, the capsule shells should be composed of a material which melts between 40° and 110° C. and which is immiscible in the aqueous electrolyte fill when both are in the liquid form. These restrictions relate to the process of encapsulation (U.S. Pat. No. 3,423,489). Among the encapsulating materials are waxes, fats, proteins, carbohydrates, gellable colloid materials such as gelatin and agar-agar, low polymers, and the like. Specific encapsulating materials include paraffin waxes having melting points of 48° C., 55° C. and 83° C., microcrystalline waxes, etc. These can be used alone or together with other waxes and materials. A useful encapsulating composition is the following (the parts being given by weight):

| | Parts |
|---|---|
| Paraffin wax, M.P. 55° C. | 44.95 |
| Paraffin wax, M.P. 83° C. | 44.95 |
| Copolymer of ethylene and ethyl acrylate (commercially available under the designation "Dow EA-2018"a) | 10 |
| Butylated hydroxy toluene (anti-oxidant) | 0.1 |

Capsules as described herein are essentially impossible to fracture by jarring but are easily broken by compression or by heat.

The capsules can be utilized as such or can be first coated on a web. The latter is advantageous in the manufacturing process since it means that all components of the cell can be added to the casing in sheet form (cut into circular disks or other desired shapes). The sheet carrying the capsules can be placed between the electrodes, if desired, thus doubling as a separator.

What is claimed is:

1. A disposable reserve battery in combination with a plunger means adapted for delivery of electrical energy at high current density for a relatively short period of time and capable of immediate activation comprising a closed battery casing, having an opening therein, said opening being closed by a pressure deformable barrier a cathode and an anode positioned in the casing and separated by a non-conducting porous separator in sheet form which is capable of taking up an aqueous electrolyte from a portion thereof by wicking and drawing it across the facing areas of the anode and cathode, a multiplicity of capsules ranging in diameter substantially from 300 to 4,000 microns filled with an aqueous electrolyte, the capsules being located in the proximity of the separator and positioned on said anode and within said casing adjacent said barrier but not between the anode and the cathode so that when they are ruptured the aqueous electrolyte contacts the separator, and said plunger means external to said casing and adapted to deform said barrier for rupturing the capsules from the exterior of the casing through said closed opening by pressure, the capsule shells being composed of a material which melts in range of 40° to 110° C. and which is immiscible in the aqueous electrolyte when both are in the liquid form.

2. A disposable reserve battery according to claim 1 in which the capsules range in diameter from about 300 to 3,000 microns.

3. A disposable reserve battery according to claim 1 wherein the anode is zinc and the cathode is silver oxide.

4. A disposable battery according to claim 1 wherein the anode is lead and the cathode is lead dioxide.

5. A disposable reserve battery in combination with a plunger means adapted for delivery of electrical energy at high current density for a relatively short period of time and capable of immediate activation comprising a closed battery casing having an opening therein, said opening being closed by a pressure deformable barrier, a lead dioxide cathode and a zinc anode positioned in the casing and separated by a non-conducting porous separator in sheet form which is capable of taking up an aqueous electrolyte from a portion thereof by wicking and drawing it across the facing areas of the anode and cathode, a multiplicity of capsules ranging in diameter substantially from 300 to 3,000 microns filled with aqueous sulfuric acid electrolyte, the capsules being located in the proximity of the separator and positioned on said anode and within said casing adjacent said barrier but not between the anode and the cathode so that when they are ruptured the aqueous electrolyte contacts the separator, and said plunger means external to said casing and adapted to deform said barrier for rupturing the capsules from the exterior of the casing through said closed opening by pressure, the capsules shells being composed of a material which melts in range of 40° to 110° C. and which is immiscible in the aqueous electrolyte when both are in the liquid form.

* * * * *